Nov. 8, 1955
J. W. GELLER
2,722,917
COMPRESSED AIR OPERATED RECIPROCATIVE TOOL
Filed Oct. 5, 1953
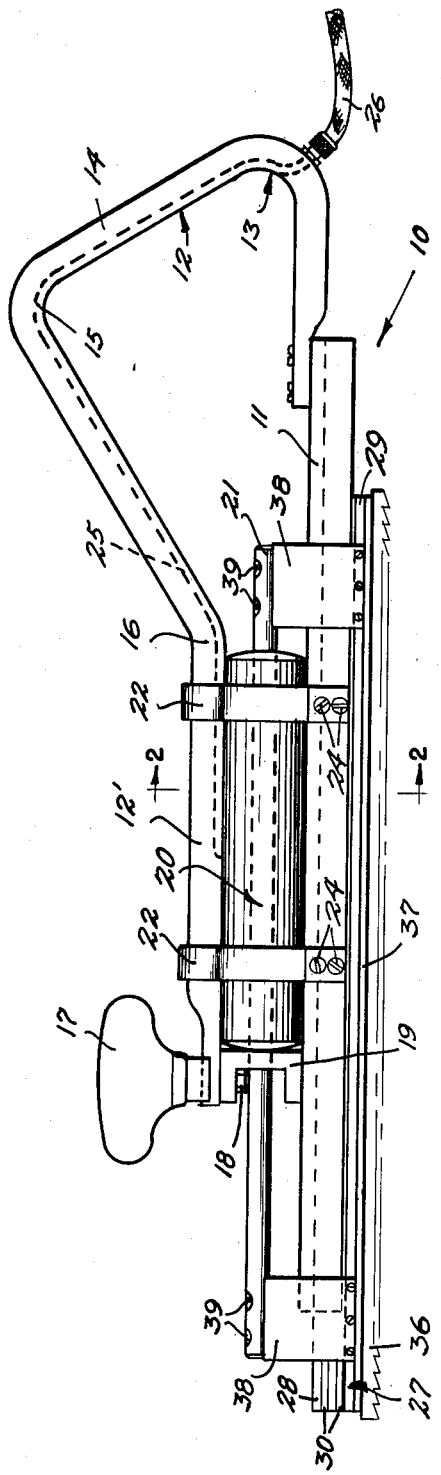
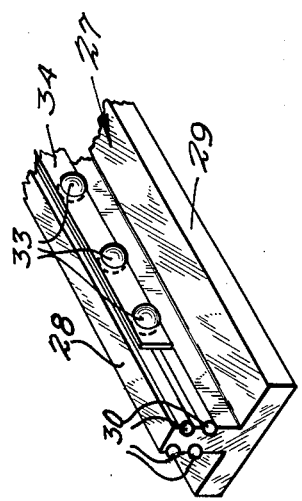
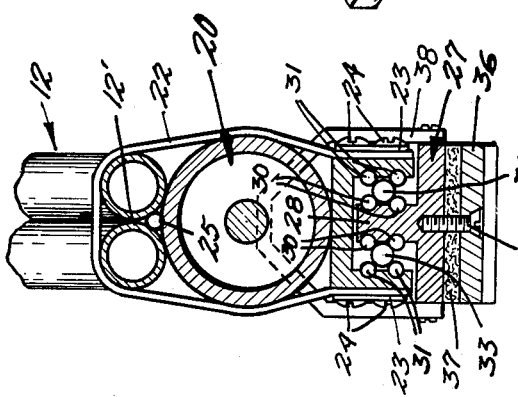
INVENTOR.
James W. Geller
BY
Glenn L. Fish
ATTORNEY United States Patent Office 2,722,917
Patented Nov. 8, 1955

2,722,917
COMPRESSED AIR OPERATED RECIPROCATIVE TOOL

James W. Geller, Nampa, Idaho

Application October 5, 1953, Serial No. 384,046

1 Claim. (Cl. 121—3)

This invention is an air operated tool and more particularly an air operated reciprocative tool adapted to have an assortment of tools individually attachable thereto.

One object of the invention is to provide an air operated tool which is adapted to support a file, rasp, sander, saw, and like attachments which operate from a reciprocative motion to eliminate the manual labor now necessary to operate the various tools.

Another object of the invention lies in the provision of a compressed air operated reciprocative device which has a frame having a hand grip at one end thereof and a reciprocative tool mounting bar carried by the frame and movable by means of an air operated motor secured to the frame.

These and other objects of the invention will become apparent during the course of the following description.

In the accompanying drawings, forming a part of this specification, and in which like numerals are employed to designate like parts:

Figure 1 is a side elevation of the improved air operated reciprocative device;

Figure 2 is a vertical transverse cross section taken as at line 2—2 of Figure 1; and, Figure 3 is a fragmentary perspective view of the tool mounting bar.

Referring now more particularly to the drawings I have shown the device as comprising a frame indicated in general by the numeral 10 and including an elongated inverted U-shaped bar 11 having secured at its rear end a pair of parallel tubular frame members 12 which are disposed in side by side contactual relation and which extend rearwardly from the bar 11 for a distance whence they are formed in an acute radius bend at 13 and thence extend upwardly at a forward incline to form a hand grip 14. At the upper extremity of the hand grip 14 the tubular members are bent in a radius right angle bend at 15 and extend forwardly at a downward incline to a point indicated at 16 and thence extend forwardly in upwardly spaced parallel relation to the bar 11. The forward end 12' of the frame members 12 is flattened and an upwardly disposed hand knob 17 is secured thereto by means of a bolt and companion nut assembly indicated at 18. A U-shaped support member 19 is welded or otherwise secured to the upper face of the bar 11 and the bolt and nut combination 18 cooperate with the support 19 to secure the forward ends of the frame members 12 and the hand knob 17.

A compressed air operated motor 20 which is of one of the many acceptable constructions, has a longitudinally reciprocable piston rod 21 which extends axially from both ends of the motor 20. The motor is disposed between the horizontally extending portion 12' of the members 12 and the bar 11 and is secured thereto by bands or straps 22 which have their ends secured to the side faces of the bar 11 and extend over the motor 20 and portion 12' of the members 12. A pressure plate 23 is disposed behind the securing bolt heads 24 and assists in applying the bands 22 to clamp the motor and frame together.

As indicated by dotted lines at 25 of Figure 1 and full line of Figure 2, an air conduit extends along the configuration of the frame members 12 and communicates air hose 26 with the air motor 20.

An inverted T-shaped tool mounting member or bar 27 has its shank 28 disposed between the walls of the channel shaped member 11 and its cross piece 29 is disposed horizontally thereunder. The outer side faces of the shank 28 are provided with pairs of vertically spaced longitudinally extending rods 30 partially imbedded in the faces and these pairs of rods are horizontally aligned with other pairs of vertically spaced longitudinally extending rods 31 partially imbedded in the inside faces of the side walls of the U-shaped member 11. Each pair of rods, 30 or 31, are disposed a distance from their companion pair of rods equal to the distance between the rods in each pair. A plurality of ball bearings 33 confined within suitable retainers 34 are disposed within the companion pairs of rods and reciprocably support the T-shaped member 27 within the U-shaped member 11.

Rods 30 and 31 may be rotated about their axes to dispose the worn faces away from the ball bearings and thus maintain the tight fit desired.

The tool mounting member 27 is provided with means 35 for mounting a tool such as the file 36 to the member 27. Other tools, such as a sanding device, a saw blade, and the like may be individually secured to the tool mounting bar 27. A fibrous pad cushion 37 is secured intermediate the tool 36 and the tool mounting bar 27.

Yokes 38 have their lower ends secured to the sides of the bar 27 and loosely encircle the bar 11. The upper ends of the yokes are releasably secured by means of stub bolts 39 to the end portions of piston rod 21.

Having thus described my invention, I claim:

A compressed air operated reciprocative device comprising an elongated inverted U-shaped bar constituting a frame member; a pair of parallel tubular frame members disposed in side by side contactual relation and secured at one end to the rear end of said bar; said tubular frame members being shaped to form a hand grip at the rear end of said tool and extending forwardly above said bar in spaced parallel relation; an upwardly presented hand knob spaced forwardly from the longitudinal center of said bar and supported on said tubular members; an air operated reciprocative motor having a longitudinally reciprocative piston rod and disposed intermediate said bar and said spaced parallel portion of the tubular members; a band rigidly clamping said motor between the bar and tubular members; an inverted T-shaped reciprocative tool mounting bar having its shank portion disposed within the U-shaped bar and having a supporting bearing therein for longitudinal parallel reciprocative movement of said mounting bar relative to said U-shaped bar; yokes secured at their ends to said mounting bar and extending transversely of said device in encircling relation to said U-shaped bar and secured to said reciprocative rod, whereby movement is imparted to said mounting bar; and means associated with said mounting bar for securing an assortment of tools thereto individually.

References Cited in the file of this patent

UNITED STATES PATENTS

| 2,255,395 | Spink | Sept. 9, 1941 |
| 2,666,978 | Skillman | Jan. 26, 1954 |
| 2,672,378 | McVey | Mar. 16, 1954 |